United States Patent Office

3,508,955
Patented Apr. 28, 1970

3,508,955
METHOD OF MAKING SELF-LUBRICAT-
ING FLUORIDE-METAL COMPOSITE
MATERIALS
Harold E. Sliney, Parma, Ohio, assignor to the United
States of America as represented by the Administrator
of the National Aeronautics and Space Administration
No Drawing. Original application May 1, 1967, Ser. No.
635,972,, now Patent No. 3,419,363, dated Dec. 31,
1968. Divided and this application Mar. 11, 1968, Ser.
No. 711,921
Int. Cl. B44d 1/02
U.S. Cl. 117—119        3 Claims

ABSTRACT OF THE DISCLOSURE

Making a self-lubricating composite material for use in a chemically reactive environment by impregnating a porous metal with a barium fluoride-calcium fluoride eutectic composition.

STATEMENT OF GOVERNMENT OWNERSHIP

The invention described herein was made by an employee of the United States Government and may be manufactured and used by or for the Government for governmental purposes without the payment of any royalties thereon or therefor.

RELATED APPLICATION

This application is a division of copending application Ser. No. 635,972 which was filed on May 1, 1967 and issued as U.S. Pat. No. 3,419,363 on Dec. 31, 1968.

THE INVENTION

This invention is concerned with making a self-lubricating bearing or sealing material that will function as a lubricant and be chemically stable at high temperatures in reactive environments. This invention is particularly directed to producing such material for use as temperatures above 1000° F. in air, hydrogen, and liquid alkali metals.

Problems have been encountered in bearings and seals for outer space applications where high temperatures are encountered in reactive environments. An example of such an application is a heat transfer system which utilizes liquid sodium. Conventional lubricants are unsatisfactory for lubricating bearings and contacting surfaces of seals in such systems.

Solid lubricants have been proposed for use in many lubrication problem areas. Such lubricants can be used at extremely high temperatures with very high loads and in chemically reactive environments where conventional fluid lubricants are not suitable. These lubricants are most frequently used as coatings or dry films bonded to pretreated substrates of a dense metal. While very low wear rates and friction coefficients are realized with solid lubricant coatings, some wear is unavoidable because of sliding contact. Metal-to-metal contact occurs when the coating wears through, and severe damage to the unprotected bearing surfaces results.

Such problems can be solved by incorporating the solid lubricant into a composite bearing material. The solid lubricant is dispersed throughout a supporting material, and as wear occurs more lubricant is exposed to become available to the sliding surface. It has been suggested that such materials could be prepared by powder metallurgy techniques, such as by hot pressing premixed powders of the lubricant and the metal. A disadvantage of composites prepared entirely by hot pressing or sintering of premixed powders of the lubricant and the metal is that they are somewhat limited in mechanical strength. When metal and solid lubricant powders are mixed prior to compaction, particles of a lubricant will occupy and thus interfere with some of the potential sites for bonding between metal particles. Also, it is difficult to prepare a nonporous body by hot pressing or sintering.

A dense, strong composite is prepared in accordance with the present invention by impregnating a porous metallurgically bonded structure with a fluoride or fluorides of metals selected from Groups I and II of the Periodic Table of elements. These fluorides exhibit improved stability in many corrosive environments.

It is, therefore, an object of the present invention to provide a method of making a self-lubricating material for use in bearings and seals.

Another object of the invention is to provide a method of making an improved self-lubricating material for use in chemically reactive environments at high temperatures.

A further object of the invention is to provide a method of making a self-lubricating material that is chemically stable in air, hydrogen and liquid alkali metal at temperatures above 1000° F.

These and other objects of the invention will be apparent from the specification which follows:

A self-lubricating material is produced by infiltrating a porous metal with fluorides of Group I and II metals. The metal must be porous at the start of the infiltration process. Such a metal is prepared by powder metallurgy techniques, fiber metal processes, or foam metal methods.

Vacuum impregnation is used to disperse the fluorides throughout the porous metal. This is accomplished by positioning a porous metal in a metal container with an amount of powder fluoride salt in excess of that required to completely fill the voids in the porous metal and sufficient to keep this metal completely submerged after the salt melts. The container is placed in the metal chamber which is sealed and then evacuated. The chamber is induction heated at 2000° F. to melt the fluoride which then infiltrates into the porous metal by capillary action. In order to minimize evaporation of the melted fluoride, chamber pressures below one micron are avoided. As a precautionary measure, in case capillary forces are not sufficient to insure complete impregnation of the metal, argon or nitrogen is introduced at a pressure of about 10 p.s.i. to force the molten fluorides into any remaining voids.

Impregnated metal is then cooled under inert gas pressure. Subsequent to cooling, the impregnated metal is removed from the container and wet sanded to remove excess fluoride adhering to the surface.

To better illustrate the beneficial technical effects of the invention, composite materials were prepared in accordance with the previously described method. These materials included a porous nickel and a sintered nickel-chromium alloy which were vacuum impregnated with a molten barium fluoride-calcium flouride eutectic. Friction and wear of each of the resulting composite materials were determined in air and in dry hydrogen at temperatures from 80° to 150° F. and at a sliding velocity of 2000 feet per minute. The influence of sliding velocity and friction was also determined. Approximate elastic moduli and compressive yield strengths of filled and unfilled test specimens were determined.

The starting metal must be porous to achieve the proper impregnation. Porous nickel having a foam-like structure with densities of from 50% to 60% was used as a starting metal. Also, a porous nickel-chromium alloy was prepared by a standard powder metallurgy technique from 100 mesh powders. The powder was hydrostatically pressed at 20,000 p.s.i. and then sintered in hydrogen for one hour 2150° F. This produced a porous metal body of about 65% density with typical pore diameters of 25 to 35 microns.

tional area, and multiplying the area of the average wear track circumference.

The chemical compositions and melting ranges of the materials used are shown in Table I. The first column in Table I shows the composition of the cast nickel-chromium alloy used in the rider specimens. The second column shows the composition of the porous nickel-chromium metal alloy. The third column shows the composition of the dense material used as a substrate for bonded coatings which were studied for comparative purposes. The fourth column shows the barium fluoride-calcium fluoride eutectic composition used to impregnate the porous metal.

In some cases, specimens were spray coated with 0.001 inch of fluoride eutectic. After spraying, the specimens were fired in hydrogen at 1750° F. for ten minutes. This is below the eutectic melting point of 1872° F. shown in Table I and avoids loss of fluoride infiltrant; however, this temperature is high enough to cause sintering of the fluoride particles in the coating which establishes the necessary bond.

TABLE I.—NOMINAL CHEMICAL COMPOSITIONS AND MELTING RANGES OF MATERIALS USED

| | Composition, wt. percent | | | |
|---|---|---|---|---|
| | Cast nickel-chromium alloy | Nickel-chromium alloy powder for composites | Defense nickel-chromium coating substrate alloy | $BaF_2$-$CaF_2$, filler |
| Material: | | | | |
| Nickel | 68.50 | Balance | Balance | |
| Cobalt | | | 11.00 | |
| Chormium | 15.50 | 15.00 | 19.00 | |
| Iron | 9.00 | 7.00 | 5.00 | |
| Carbon | .20 | .05 | .10 | |
| Silicon | 1.60 | .40 | .50 | |
| Molybdenum | | | 10.00 | |
| Aluminum | | .75 | 1.50 | |
| Manganese | 1.00 | .50 | .10 | |
| Copper | .50 | .05 | | |
| Niobium | 2.00 | .90 | | |
| Titanium | | 2.50 | 3.00 | |
| Sulfur | | .007 | | |
| $BaF_2$ | | | | 62 |
| $CaF_2$ | | | | 38 |
| Rockwell hardness: | | | | |
| As cast | 890 | | | |
| Aged (dense form) | | C38 | C40 | |
| Melting point, F | 2,500–2,550 | 2,540–2,600 | 2,500 | 1,872 |

Disk and rider specimens of both the nickel and the nickel-chromium alloy were infiltrated with barium fluoride-calcium fluoride eutectic. This infiltration was accomplished by vacuum impregnating the specimens at a temperature between 1900° and 2000° F. in the manner previously described.

The specimens which were in the form of disks were mounted for rotation in sliding contact with a hemispherically tipped rider under a normal load of 500 grams. This was done in a high temperature friction test apparatus in which the rider slides on a two inch diameter wear track on each disk. The sliding is unidirectional and the velocity is capable of being continuously varied and closely controlled over a range of 200 to 2500 feet per minute. For certain tests the specimens can be heated by an induction coil around the disk specimen with the temperature being monitored by an infra-red pyrometer.

Rider and disk wear volumes are determined from weight losses and the known densities of the specimen. If weight changes not attributable to wear are likely, wear volumes of the riders are calculated from the diameter of the wear scars and the known hemispherical radii. Disk wear volumes are determined by taking a surface profile across the wear track, determining its cross-sec- The compressive mechanical strength properties of unfilled porous nickel, nickel-chromium alloy, and fluoride-metal composites were determined. The results are set forth in Table II.

For comparison, tensile data for dense nickel and dense nickel-chromium alloy are shown in the first and fourth columns, respectively, of Table II. The properties measured were the yield strength (at 2% offset), fracture strength, and the elastic modulus (all in compression). These properties are shown in the third, fourth, and fifth lines of Table II.

The yield strength of porous nickel having a theoretical density of 53.5% was 4800 p.s.i. as shown in the second column. The yield strength for annealed dense nickel was 19,000 p.s.i. as shown in the first column. Impregnation of the porous nickel with barium fluoride-calcium fluoride eutectic increased the yield strength 29,000 p.s.i. as shown in the third line of the third column in Table II. This nickel composite is applicable to seals. The compressive fracture strength of the composites was 50,000 p.s.i. This difference between the yield strength and the fracture strength demonstrates that, in spite of the relatively brittle nature of the fluoride eutectic at room temperature, the nickel composite is capable of appreciable plastic deformation prior to fracture. The average elastic modulus of the composite was about .4 that of the dense nickel.

TABLE II.—PHYSICAL AND APPROXIMATE COMPRESSIVE STRENGTH PROPERTIES OF MATERIALS USED

| | Material | | | | | |
|---|---|---|---|---|---|---|
| | Porous Nickel | Porous Nickel | Nickel-composite | Dense nickel-chromium alloy | Sintered nickel-chromium | Nickel-chromium composite |
| Condition | Annealed | | Vacuum-impregnated | Age-hardened | As-sintered | Vacuum-impregnated |
| Density: | | | | | | |
| g./cu. cm | 8.90 | 4.75 | 6.57 | 8.25 | 5.75 | 6.90 |
| Percent of theoretical | 100 | 53.5 | 97.6 | 100 | 69.6 | 100 |
| Yield strength at 0.2% offset (1,000 p.s.i.) | ¹ 12-25 | 4.3-5.2 | 21-36 | ¹ 92-119 | 12-19 | 78-80 |
| Ultimate fracture strength (1,000 p.s.i.) | ¹ 50-60 | 11 | 50 | ¹ 162-179 | 45 | 83+ |
| Elastic modulus (10⁶ p.s.i.) | ¹ 30 | 1.8-2.2 | 10-15 | ¹ 31 | 8.2-9.6 | 19-21 |
| Hardness: | | | | | | |
| Rockwell 15T (superficial hardness) | 77 | 15 | 76 | 94 | 35 | 86 |
| Equivalent standard Rockwell | B55 | (¹) | B54 | C38 | (²) | B82 |

[1] Tensile.
[2] Below Range of B Scale.

The effects of the fluoride impregnant on the properties of the nickel-chromium porous material were similar as shown in the last column in Table II. However, the alloy composites were much stronger than the nickel composites making this material more desirable for bearings. The yield strength was 79,000 p.s.i. which is about 75% of the yield strength of the age-hardened, dense alloy. Fracture strength was greater than 83,000 p.s.i. The elastic modulus was $20 \times 10^6$ p.s.i. which is about two-thirds of the elastic modulus of the dense metal.

Brittle materials are characteristically stronger in compression than in tension. Therefore, the compressive strength properties of the composite that contained a relatively brittle fluoride phase at room temperature may be considerably higher than the corresponding tensile strength. However, for ductile, nonporous metals, the modulus of elasticity and yield strength are about the same in either tension or compression. Therefore, the tensile properties for nickel and nickel-chromium alloy which are given in Table II should be approximately equivalent to their compressive strength properties.

Photomicrographs of the composites formed by the impregnation of 50% dense nickel with the barium fluoride-calcium fluoride eutectic revealed no unfilled pores. The magnitude of the weight increase after impregnation indicated the composite density is within 97% to 100% theoretical.

The effect of rider geometry and composition on friction and wear of the nickel composites was studied in air at 1000° F. with a 500 gram load and a sliding velocity of 2000 feet per minute. The results of this test are set forth in Table III.

When an extremely hard tungsten carbide rider with a three-sixteenth-hemispherical radius was used, no rider wear was detectable after one hour. However, the wear track on the composite disk material was deeply grooved. The groove was primarily caused by plastic deformation of the composite.

When a composite rider of sintered 80% nickel chromium-20% calcium fluoride was used, some rider wear occurred. However, severe plastic deformation of the wear track on the composite disk was still evident. When a softer composite rider having the same composition of the disk was used, plastic deformation was not evident. Rider wear was of about the same magnitude as the disk wear. Friction coefficients for all three of the above cases were in the range of 0.15 to 0.20 as shown in Table III.

TABLE III.— LUBRICATING PROPERTIES OF NICKEL COMPOSITES; EFFECTS OF RIDER PARAMETERS AND PRE-COATING COMPOSITES

[Atmosphere, air; temperature, 1,000 F.; sliding velocity, 2,000 ft./min.; load 500 g.]

| Rider | | | Range of friction coefficient during first hour, (229,200 cycles) | Wear rate of rider, cu. in./hr | Wear rate of composite disk material, cu. in./hr | Total wear rate, cu. in./hr |
|---|---|---|---|---|---|---|
| Radius of contact hemisphere, in. | Material | Disk material | | | | |
| 3/16 | Cobalt-bonded tungsten carbide. | 50% nickel, 50% BaF₂-CaF₂ eutectic | 0.15-0.20 | <10⁻⁷ | (¹) | |
| 3/16 | Sintered 80% nickel-chromium, 20% CaF₂. | do | 0.15-0.20 | 10⁻⁵ | (¹) | |
| 3/16 | 50% nickel, 50% BaF₂-CaF₂ eutectic. | do | 0.15-0.20 | 3.0×10⁻³ | 1.6×10⁻³ | 4.6×10⁻³ |
| 7/8 | Cast nickel-chromium alloy. | 60% nickel, 40% BaF₂-CaF₂ eutectic | 0.20-0.25 | 2.0×10⁻⁶ | 2.2×10⁻³ | 2.2×10⁻³ |
| 7/8 | do | 60% nickel 40% BaF₂-CaF₂ eutectic and coated with 0.001 in. overlap of eutectic. | 0.04-0.08 | 6.3×10⁻⁷ | 4.5×10⁻⁴ | 4.5×10⁻⁴ |

[1] Severe plastic deformation.

Plastic deformation of the disk is minimized by increasing the radius on the hemispherical rider to seven-eighths inch thereby reducing the contact stress. This deformation is also reduced by using a denser (60%) nickel matrix for the composite disk. With this combination, plastic deformation of the composite was reduced, but the friction coefficient was higher.

The composite was then coated with a thin sintered film of barium fluoride-calcium fluoride eutectic as previously described. With a seven-eighths inch radius cast nickel-chromium alloy rider sliding on the coated disk, the friction coefficient was 0.04 to 0.08. Both rider and disk wear were the lowest observed.

Based on the results shown in Table III, additional experiments were conducted with coated composite disks of the 60% nickel content and with seven-eighths inch radius cast alloy riders. The specimens were tested at a constant sliding velocity of 2000 feet per minute at various temperatures. It was found that wear was higher at 80° and 500° F. than at 1000° and 1200° F. But metal transfer or other evidence of severe surface damage, which might be attributable to wear, was not observed at any of these temperatures. However, the nickel composites were severely oxidized in air at 1200° F.

Referring again to Table II, the fluoride-impregnated nickel-chromium alloy composites have higher strength and better oxidation resistance than nickel. These composites were studied at various temperatures at a constant sliding velocity of 2000 feet per minute. It was found the disk wear was lower at all temperatures for alloy composites than for the nickel composites. Rider wear was low at all temperatures. In contrast, rider wear against an unlubricated alloy in the dense wrought form was several hundred times higher than rider wear against the alloy composites. Friction coefficients of the alloy composites were comparable to those observed for nickel composites. Oxidation of the alloy composites was not serious at 1200° F. but was severe at 1500° F. Oxidation, therefore, limits the maximum surface temperature in air to about 1350° F.

Nickel-chromium alloy composites were also studied for friction and wear in a hydrogen atmosphere. Very little wear was observed at all temperatures, and disk wear rate was nearly constant for all temperatures. Rider wear rate increased slightly with temperature. The friction coefficients were 0.20 at 80° F. and gradually decreased with temperature to 0.06 at 1500° F. No deterioration of the composite occurred at 1500° F.

A common serious limitation on high temperature fluoride and oxide solid lubricants is poor room-temperature lubricating characteristics. Therefore, the low wear rates abserved at 80° F. are as significant as the good high temperature properties.

The friction coefficients at low temperatures below 500° F. can be further reduced by the addition of finely powdered silver. A 35% by weight silver addition to the composition of the sintered fluoride overlay is effective for the optimum reduction in the friction coefficients below 500° F.

The wear life of nickel alloy composites in air and hydrogen are shown in Table IV. The slider materials included riders of a cast nickel-chromium alloy, composite disks of nickel-chromium alloy vacuum impregnated with $BaF_2$-$CaF_2$ eutectic and provided with a 0.0005 inch sintered film of the same eutectic, and coated dense metal disks having a 0.001 inch fused coating of $BaF_2$-$CaF_2$ eutectic on a dense nickel-chromium alloy.

Because no distinct lubrication failure for air could be determined, failure was arbitrarily taken as the time at which the friction coefficient first increased to 0.30.

In air, the endurance life of the composite exceeded one million cycles at 500°, 1000°, and 1200° F. At 80° F., the friction coefficient was greater than 0.30, and zero wear life is indicated. The low wear rate at 80° F. indicates the composite could be used at this temperature in applications where friction coefficient of less than 0.3 is not essential. Or a silver addition to the fluoride overlay could be employed to reduce the friction coefficient at 80° F. to approximately 0.2. At 1500° F. the wear life was 85,000, but severe oxidation occurred.

TABLE IV.—COMPARATIVE WEAR LIFE OF COMPOSITES AND COATINGS IN AIR AND HYDROGEN

| Specimen temperature, F. | Cycles at which friction coefficient increased to 0.30 | | | |
|---|---|---|---|---|
| | Air | | Hydrogen | |
| | Composites | Coatings | Composites | Coatings |
| 80 | | | 1,560,000 | |
| 500 | 2,750,000 | 115,000 | 1,490,000 | |
| 1,000 | 1,150,000 | 389,000 | 1,610,000 | 275,000 |
| 1,200 | 1,370,000 | | 1,370,000 | |
| 1,500 | 850,000 | | 570,000 | |

In hydrogen, the experiments were terminated after 1,500,000 cycles if the friction coefficient had not yet increased to 0.30. The results were similar to those obtained in air with the exception of the friction coefficient at 80° F. was lower in hydrogen than in air, and the composite ran a full 1,500,000 cycles at friction coefficients below 0.30. At 500° and 1000° F., wear life of the composites was far superior to the wear life of the fluoride coatings bonded to a dense metal substrate. No tests were made on the coated specimens where blank spaces appear in Table IV.

The aforementioned tables and description show that low wear rates of the cast alloy riders and of the composite disks were obtained for both types of fluoride-metal composites. Friction coefficients were higher for the composites than for dense substrate metals lubricated with a thin coating of the same fluorides. However, the advantages of coatings giving low friction and of composites giving longer life were obtained by coating the composites with a thin, sintered film of the same composition as the fluoride impregnant.

In air, the maximum useful service temperature of a nickel composite is about 1100° F. The corresponding temperature of the alloy composite is around 1350° F. In hydrogen, the alloy composite performs satisfactorily at 1500° F.

What is claimed is:
1. A method making a self-lubricating composite material comprising the steps of:
   positioning a porous metal in a sealable chamber,
   placing a powdered barium fluoride-calcium fluoride eutectic composition in said chamber prior to sealing, the amount of said eutectic composition being in excess of that required to completely fill the voids in said porous metal and sufficient to keep the porous metal completely submerged upon melting,
   sealing said chamber with said metal and eutectic composition therein,
   evacuating said sealed chamber,
   heating said sealed chamber with said metal and eutectic composition therein to about 2000° F. to melt said eutectic composition whereby said melted eutectic composition infiltrates into said porous metal by capillary action,
   introducing a pressurized gas into said chamber to force the molten eutectic composition into any remaining voids, and
   cooling said infiltrated alloy under inert gas pressure.
2. A method of making a self-lubricating composite material as claimed in claim 1 wherein a porous metal having a density of about 50% to 60% is filled with a melted eutectic composition by impregnation.
3. A method of making a self-lubricating composite material as claimed in claim 1 wherein the pressurized gas is introduced into the chamber at a pressure of about 10 p.s.i.

References Cited

UNITED STATES PATENTS

| 2,445,003 | 7/1948 | Ramadanaff. | |
| 3,104,917 | 9/1963 | Schwartzwalder | 117—127 X |
| 3,297,571 | 1/1967 | Bonis | 252—12 |
| 3,369,924 | 2/1968 | Duggins et al. | 117—119 X |

ALFRED L. LEAVITT, Primary Examiner

C. K. WEIFFENBACH, Assistant Examiner

U.S. Cl. X.R.

117—98, 113, 127; 252—12.2